United States Patent
Gölling et al.

(10) Patent No.: US 8,844,571 B2
(45) Date of Patent: Sep. 30, 2014

(54) FLUID ACTUATOR FOR PRODUCING A PULSED OUTLET FLOW IN THE FLOW AROUND AN AERODYNAMIC BODY, AND DISCHARGE DEVICE AND AERODYNAMIC BODY EQUIPPED THEREWITH

(75) Inventors: Burkhard Gölling, Stuhr (DE); Matthias Bauer, Berlin (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/355,544

(22) Filed: Jan. 22, 2012

(65) Prior Publication Data

US 2012/0186682 A1 Jul. 26, 2012

Related U.S. Application Data

(63) Continuation of application No. PCT/EP2010/004541, filed on Jul. 23, 2010.

(60) Provisional application No. 61/227,820, filed on Jul. 23, 2009.

(30) Foreign Application Priority Data

Jul. 23, 2009 (DE) .......................... 10 2009 034 417

(51) Int. Cl.
   - *F15C 1/22* (2006.01)
   - *B64C 21/02* (2006.01)
   - *F15D 1/12* (2006.01)

(52) U.S. Cl.
   CPC .................. *F15C 1/22* (2013.01); *B64C 21/025* (2013.01); *Y02T 50/166* (2013.01); *B64C 2230/18* (2013.01); *F15D 1/12* (2013.01)
   USPC ........ 137/834; 137/825; 137/837; 137/487.5; 239/592; 239/598

(58) Field of Classification Search
   USPC ......... 137/825, 826, 832, 833, 834, 837, 838, 137/839, 486, 487.5; 239/592, 593, 594, 239/595, 597, 598
   See application file for complete search history.

(56) References Cited

U.S. PATENT DOCUMENTS 3,101,906 A * 8/1963 Webber .......................... 239/592
3,139,895 A * 7/1964 Comparin ...................... 137/837

(Continued)

FOREIGN PATENT DOCUMENTS

| DE | 15 23 651 | 5/1969 |
|---|---|---|
| DE | 60 2006 001 040 | 7/2009 |

(Continued)

OTHER PUBLICATIONS

McLean et al., "Study of the Application of Separation Control by Unsteady Excitation to Civil Transport Aircraft," NASA (1999).

(Continued)

*Primary Examiner* — John K Fristoe, Jr.
*Assistant Examiner* — Minh Le
(74) *Attorney, Agent, or Firm* — Jenkins, Wilson, Taylor & Hunt, P.A.

(57) ABSTRACT

A fluid actuator for influencing the flow along a flow surface by ejecting a fluid flowing through the fluid actuator is described. The fluid actuator has at least two outlet lines with outlet openings at the respective ends thereof, and a feed line connected to the outlet lines for feeding fluid at a supply pressure, a flow direction diverting device into which the feed line opens and out of which the outlet lines open, and an adjusting device coupled to the flow direction diverting device to control the latter. The adjusting device is configured so the fluid is conducted successively in a cyclic sequence into each of the outlet lines. A discharge device for discharging a fluid out of a flow body, and a flow body having a multiplicity of discharge openings and a discharge device of said type are also described.

18 Claims, 4 Drawing Sheets

(56) References Cited

U.S. PATENT DOCUMENTS

| | | | | |
|---|---|---|---|---|
| 3,148,691 | A | * | 9/1964 | Greenblott .................. 137/815 |
| 3,180,346 | A | * | 4/1965 | Duff .............................. 137/831 |
| 3,182,675 | A | * | 5/1965 | Zilberfarb et al. ............ 137/808 |
| 3,239,150 | A | * | 3/1966 | Chisel ..................... 239/265.23 |
| 3,289,687 | A | * | 12/1966 | Dunaway ..................... 137/831 |
| 3,357,441 | A | * | 12/1967 | Adams ......................... 137/831 |
| 3,376,881 | A | * | 4/1968 | Godwin ....................... 137/832 |
| 3,428,066 | A | * | 2/1969 | Herr ............................. 137/827 |
| 3,465,790 | A | | 9/1969 | Everhard |
| 3,486,517 | A | * | 12/1969 | Gaura .......................... 137/832 |
| 3,521,654 | A | * | 7/1970 | Brautaset et al. ............ 137/831 |
| 3,533,428 | A | * | 10/1970 | Rudle ........................... 137/833 |
| 3,550,606 | A | * | 12/1970 | Thorburn ..................... 200/81.4 |
| 3,570,513 | A | * | 3/1971 | Paine et al. .................... 137/13 |
| 3,584,635 | A | * | 6/1971 | Warren ........................ 137/817 |
| 3,672,387 | A | * | 6/1972 | Harris et al. ................. 137/827 |
| 3,680,574 | A | | 8/1972 | Price |
| RE27,712 | E | * | 7/1973 | Becker et al. ................ 137/831 |
| 3,752,187 | A | * | 8/1973 | Retallick ...................... 137/833 |
| 3,797,527 | A | * | 3/1974 | Bain ............................. 137/832 |
| 4,074,808 | A | * | 2/1978 | Gillespie et al. ............. 209/587 |
| 4,291,395 | A | * | 9/1981 | Holmes .......................... 367/83 |
| RE30,870 | E | * | 2/1982 | Inoue .............................. 137/13 |
| 4,413,795 | A | * | 11/1983 | Ryan .......................... 244/3.22 |
| 6,726,130 | B2 | * | 4/2004 | Jaubertie ...................... 239/589 |
| 7,080,664 | B1 | * | 7/2006 | Ayer ............................. 137/832 |
| 7,096,888 | B1 | * | 8/2006 | Thurston et al. ............. 137/818 |
| 7,182,082 | B2 | | 2/2007 | Hoffrichter |
| 7,669,780 | B2 | * | 3/2010 | Sugano et al. .................. 239/11 |
| 2002/0088881 | A1 | * | 7/2002 | Jaubertie ...................... 239/592 |
| 2005/0189018 | A1 | * | 9/2005 | Brodeur et al. ............ 137/487.5 |
| 2006/0273197 | A1 | | 12/2006 | Saddoughi et al. |
| 2008/0149205 | A1 | | 6/2008 | Gupta et al. |
| 2010/0123031 | A1 | * | 5/2010 | Weber ....................... 239/589.1 |

FOREIGN PATENT DOCUMENTS

| | | |
|---|---|---|
| EP | 1 623 922 | 7/2005 |
| FR | 2 051 956 | 4/1971 |
| GB | 1077259 | 7/1967 |
| WO | WO 2007/047997 | 4/2007 |
| WO | WO 2008/135967 | 11/2008 |

OTHER PUBLICATIONS

Petz et al., "Designing Actuators for Active Separation Control Experiments on High-Lift Configurations," Berlin University of Technology, 1st Active Flow Control Conference (2006).

International Search Report for Application Serial No. PCT/EP2010/004541 dated Oct. 14, 2010.

International Preliminary Report on Patentability and Written Opinion for Application Serial No. PCT/EP2010/004541 dated Feb. 7, 2012.

* cited by examiner

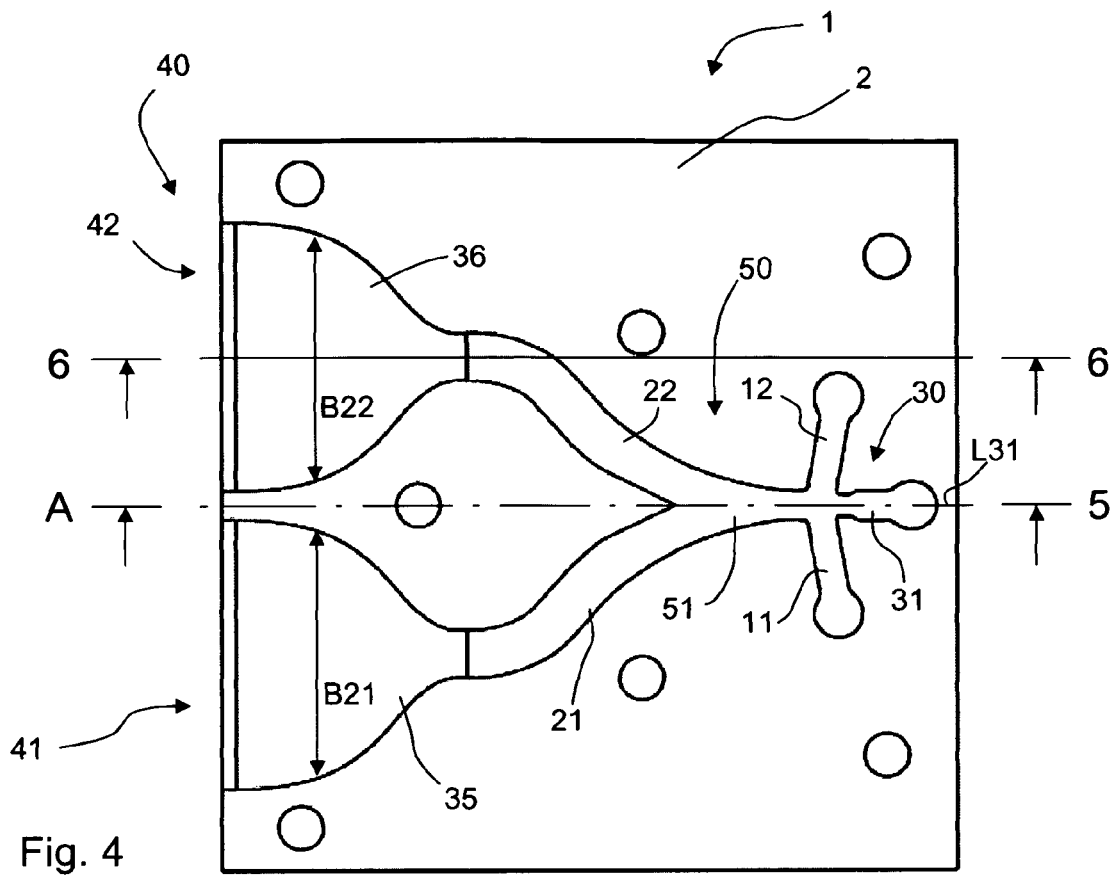
Fig. 4
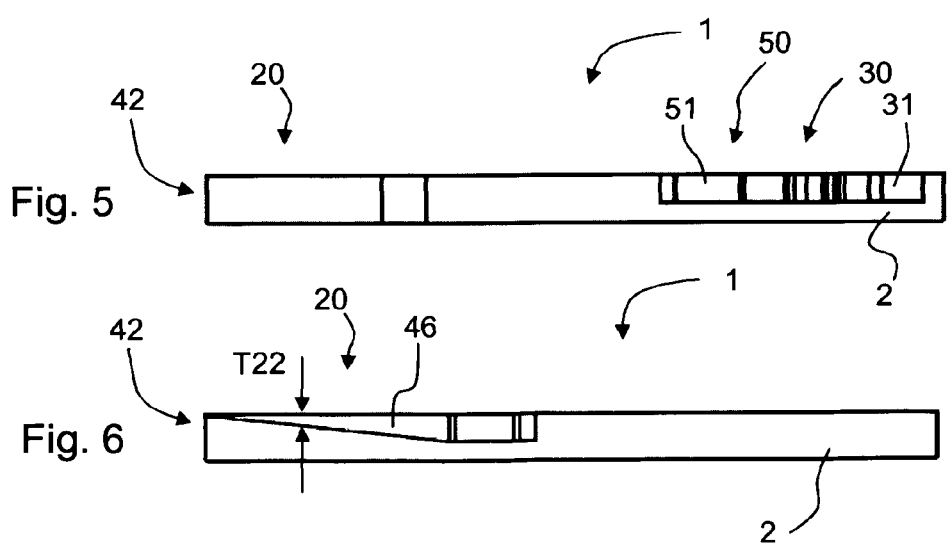
Fig. 5
Fig. 6

FLUID ACTUATOR FOR PRODUCING A PULSED OUTLET FLOW IN THE FLOW AROUND AN AERODYNAMIC BODY, AND DISCHARGE DEVICE AND AERODYNAMIC BODY EQUIPPED THEREWITH

CROSS-REFERENCE TO RELATED APPLICATIONS

The present application is a continuation of International Application No. PCT/EP2010/004541, filed on Jul. 23, 2010, which claims priority from German Application DE 10 2009 034 417.9, filed on Jul. 23, 2009, and claims the benefit of U.S. Provisional application 61/227,820, filed on Jul. 23, 2009, each of which is hereby incorporated in its entirety by reference.

FIELD OF THE INVENTION

The invention relates to a fluid actuator for generating a pulsed outlet flow in the enveloping flow of an aerodynamic body, a blow-out device including a like fluid actuator, and an aerodynamic body including a like blow-out device.

BACKGROUND

A fluid actuator is known, for example, from DE 60 2006 001 040 T2.

In order to control the flow detachment on a wing or a wing flap, the pulsed ejection of pressurized air was found to be more efficient in terms of aerodynamics than, for instance, continuous ejection, since it is possible to make use of instabilities in the flow. This may be learned, e.g., from "On flow separation and its control" by Nishiri, B. and Wygnanski, I. in ECCOMAS; 1996. In the NASA study "Study of the Application of Separation Control by Unsteady Excitation to Civil Transport Aircraft" by J. D. McLean et al. of June 1999 and in the study "Designing Actuators for Active Separation Control Experiments on High-Lift Configurations" by Ralf Petz and Wofgang Nitsche, Berlin University of Technology, the possibility of pulsed ejection of air on the outside of an aerodynamic wing is described.

From the general prior art it is known to use mechanical valves which admit or prevent through flow by periodically opening and closing a flow channel in order to generate a pulsed flow of air. In order to be able to switch high frequencies for the pulsed ejection with the aid of such valves, the cross-sections of flow of the outlet lines must be kept very small, thus engendering high aerodynamic losses. The total pressure losses then amount to more than 90%. In addition, mechanically movable components limit the service life and failure safety of the valves. Usually, fast-switching valves are actuated via solenoids which are characterized by a high intake of electric power, are accompanied by strong electromagnetic fields, and as a general rule necessitate complex control electronics. It is a further drawback of these solutions—since valves provided in this context are only produced in large series—that matching to the particular application in regard of structural size and performance data is, as a general rule, not possible in a meaningful way.

SUMMARY

Various embodiments of the invention provide a fluid actuator for integration on an outside of an aerodynamic body enveloped in a fluid flow for generating a pulsed outlet flow in the enveloping flow of the aerodynamic body, which fluid actuator has a simple construction and allows adaptation to the particular circumstances of the individual application in an efficient manner.

In accordance with various embodiments of the invention, a fluid actuator for influencing the flow along a flow surface by ejection of a fluid flowing through the fluid actuator is provided, including at least two outlet lines having outlet openings provided at the respective ends thereof and a supply line connected to the outlet lines for supplying fluid at a feed pressure, a flow direction deflecting device into which the supply line merges and from which the outlet lines emerge, and an actuating device coupled with the flow direction deflecting device for controlling the latter. Moreover an actuating device coupled to the flow direction deflecting device for controlling the latter is provided, which is adapted in such a way that the fluid is successively conducted into each one of the outlet lines in a cyclical sequence. Due to the use of a flow direction deflecting device and several outlet lines or outlet openings into or through which the fluid of the same supply or pressure source is conducted, the actuator of embodiments of the invention does not require any movable parts for generating pulsed ejection at each one of the outlet openings. Instead, the pulsed ejection is achieved by using several outlet lines into which the fluid supplied at a feed pressure is alternatingly introduced by means of a flow direction deflecting device.

Along this principle of various embodiments of the invention there is furthermore provided a fluid actuator for influencing the flow along a flow surface through ejection of a fluid flowing through the fluid actuator, said fluid actuator including an outlet device having at least two outlet lines and at least two openings for ejecting a fluid, one of which is communicated with a respective outlet line, the fluid actuator including:

a flow direction deflecting device having the form of an interaction chamber which is communicated with each one of the outlet openings via a respective flow line and which includes a flow-dividing device arranged at the inlet of the outlet lines, a supply line to the interaction chamber [with a connection to a fluid supply device] for supplying fluid into the interaction chamber at a feed pressure, at least two control lines, each for supplying fluid at a predetermined control pressure, and each of which is connected by an end to the interaction chamber.

Here the interaction chamber is configured particularly such that when fluid is supplied at a predetermined control pressure through a respective one of the control lines, the fluid flowing at a feed pressure into the interaction chamber through the supply line to the interaction chamber is deflected into one respective predetermined outlet line from among the outlet lines, so that multi-stable flow conditions are achieved in the actuator by means of the configuration of the interaction chamber.

One advantage of the fluid actuator of embodiments of the invention is due to the fact that its outflow and inflow characteristics are symmetrical, for during outflow and during inflow of the fluid, largely identical mass flows are provided which theoretically are of a same magnitude. In contrast, in the approaches known from the general prior art for generating pulsed outlet flows on a wing through periodically contracting and expanding a chamber volume (e.g., by utilizing the piezoelectric effect), the outflow and inflow characteristics are not symmetrical, for the outflow occurs at an opening that is substantially narrower in comparison with the inlet opening, in order to generate a periodical jet flow at the discharge passage.

In accordance with one practical example embodiment of the invention, the fluid actuator includes two outlet lines and two control lines, and the flow-dividing device is formed as a spike-type wall member of the interaction chamber which is situated between the two outlet lines.

In accordance with an alternative practical example embodiment of the invention, the fluid actuator includes three outlet lines and three control lines, and the flow-dividing device is formed of a first spike-type wall member situated between the inlets of a first and a second outlet line, and a second spike-type wall member which is situated between the inlets of a first and a second outlet line, in order to achieve partially stable conditions in the interaction chamber.

In accordance with one embodiment of the fluid actuator of the invention it is provided that the supply line to the interaction chamber includes a connection to a fluid supply device.

Moreover it may be provided that the two control lines are each connected by one end to a pressure control device, and each presents a connection to a fluid supply device.

In particular, the first outlet line and the second outlet line may be situated in opposition to each other relative to the longitudinal axis of the actuator, and in particular symmetrically with respect to the longitudinal axis, and the control lines are in opposition to a respective one of the inlet openings of the outlet lines relative to the center of the interaction chamber.

In accordance with one embodiment of the fluid actuator of the invention it is provided that the fluid actuator includes three outlet lines and three control lines, and that the flow-dividing device includes a first spike-type wall member which is situated between the inlets of a first and a second outlet line, and a second spike-type wall member which is situated between the inlets of a first and a second outlet line.

Here it may be provided that the first outlet line and the third outlet line are situated in opposition to each other relative to the longitudinal axis of the fluid actuator and in particular symmetrically with respect to the longitudinal axis, the second outlet line being situated between the first outlet line and the third outlet line and in particular centrally on the longitudinal axis of the fluid actuator.

In accordance with one embodiment of the fluid actuator of the invention it is provided that the fluid supply line is situated in opposition to the second outlet line relative to the center of the interaction chamber, and each one of the control lines is situated in opposition to a respective inlet opening of the first or second outlet line relative to the center of the interaction chamber. Here it may moreover be provided that the fluid actuator includes a third control line, with the first, second and third control lines having a star-shaped arrangement with regard to the spatial center, such that each control line and a respective one of the outlet lines are situated in opposition to each other relative to the spatial center of the interaction chamber.

In general it may be provided that in an end portion of the outlet lines their width increases and their depth decreases such that the cross-sectional area of the respective outlet line remains constant within a margin of deviation of 10% relative to the respective cross-sectional area of the outlet opening of the outlet lines.

In general it may be provided that in order to control and alter the inflow of fluid through the respective control line, a respective control valve of a switching device belonging to the actuating device is connected to each one of the control lines for operating the valves.

Various embodiments of the invention also provide a blow-out device for ejecting a fluid from a flow body including a like fluid actuator.

What is provided in particular in accordance with various embodiments of the invention is a blow-out device for ejecting a fluid from a flow body, said blow-out device including a fluid actuator having at least two outlet lines with outlet openings provided at the respective ends thereof and a supply line connected to the outlet lines for supplying fluid at a feed pressure, a flow direction deflecting device into which the supply line merges and from which the outlet lines emerge, and an actuating device coupled to the flow direction deflecting device for activating the latter. The actuating device includes an activating function whereby the flow direction deflecting device performs a deflection of a predetermined volume flow of the fluid supplied via the supply line into a respective one of the outlet lines, the fluid being successively conducted into each one of the outlet lines in a cyclical sequence.

In accordance with a further practical example embodiment in accordance with the invention, a blow-out device for ejecting a fluid from a flow body is provided which includes a fluid actuator in accordance with an embodiment of the invention and an actuating device. The actuating device includes a chamber having an opening for supplying fluid at a control pressure, a plurality of switching valves each of which is associated to a respective control line, and a switching device, said switching device being adapted for setting switching conditions of the switching valves, wherein one respective valve of the plurality of switching valves is opened and the at least another valve from among the plurality of switching valves is closed. The actuating device includes a switching device activating device which is functionally communicated with the switching device via a connecting line for the transmission of switching commands and which activates the switching device such that the switching valves are taken into a succession of the switching conditions where, in a cyclical sequence, a respective one of the switching valves is in an open condition while the at least another switching valve from among the plurality of switching valves is in a closed condition. Here the control pressure may in particular be provided such that in every switching condition, the fluid introduced into the interaction chamber at the feed pressure flows at a ratio of at least 75% into precisely one respective outlet line associated to said switching condition.

The switching device activating device may be adapted such that the switching device activating device may be used for adjusting the frequency of the cyclical setting of switching conditions.

In accordance with another practical example it may be provided that a sensor for detecting the flow condition is arranged on each outlet line, each sensor being functionally coupled with the respective switching device activating device for the transmission of sensor signals generated by the respective sensor, that the switching device activating device includes a regulating function which generates activating commands based on the respective received sensor signals and a target specification, and transmits them to the switching device for operating the latter.

Various embodiments of the invention also provide an aerodynamic body including a blow-out device having a fluid actuator as mentioned in the foregoing.

In accordance with various embodiments of the invention, a flow body and in particular an aerodynamic body is provided which includes a plurality of outlet openings and a blow-out device adapted in accordance with embodiments of the invention.

Here it may be provided that an actuating device of various embodiments of the invention is associated to a respective plurality of interaction chambers. To each interaction chamber there are associated, e.g., two or three outlet openings on the flow body, so that a plurality or a multiplicity of outlet openings on the flow body may be activated by means of an actuating device. As a result of this it is possible to influence a larger flow region on the flow body may by means of one actuating device.

Due to the pulsating outlet flow generated in accordance with embodiments of the invention on an aerodynamic body, detachment of the enveloping flow on the aerodynamic body is put off in a longitudinal direction of the surface thereof, whereby its enveloping flow is optimized.

BRIEF DESCRIPTION OF THE DRAWINGS

In the following, practical examples of embodiments of the invention are described while making reference to the appended figures of the drawings, wherein:

FIG. 4 is a schematic sectional view of another embodiment of a fluid actuator of the invention including two outlet lines and two control lines, FIG. 5 is a sectional view along line 5-5 of the embodiment of the fluid actuator of the invention represented in FIG. 4, FIG. 6 is a sectional view along line 6-6 of the embodiment of the fluid actuator of the invention represented in FIG. 4.

DESCRIPTION

Figure 1:
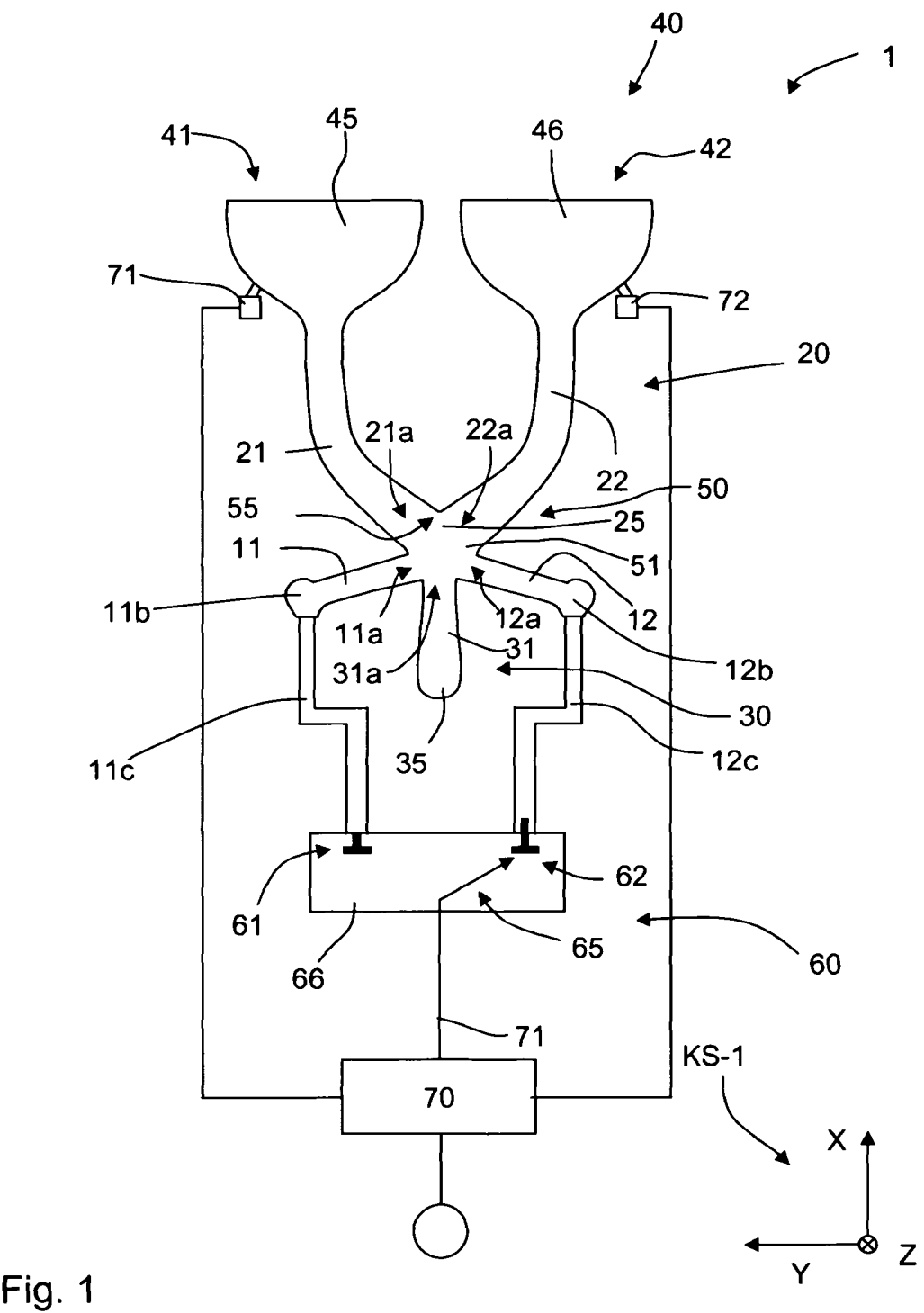
FIG. 1 is a schematic sectional view of an embodiment of a fluid actuator of the invention including two outlet lines and two control lines, having an actuating device for controlling the outlet flows through the outlet lines.

In accordance with various embodiments of the invention a fluid actuator or fluidic actuator 1 for influencing the flow along a flow surface through ejection of a fluid flowing through the fluid actuator 1 is provided. The flow body generally is a body serving a rheological function in a fluid or a medium such as, e.g., air or water. For example, the flow body may be an aerodynamic body mounted on an aircraft or a land vehicle, or may be a body mounted on, or forming part of, a water vehicle or ship. Hence, the fluid actuator is provided for integration on an outside of a flow body K enveloped by a fluid flow in order to generate a pulsed outlet flow into the enveloping flow and particularly the boundary layer of the flow body K. By introducing a pulsed outlet flow into the enveloping flow and particularly the boundary layer of the flow body K, the detachment thereof from the flow surface of the flow body may be compensated or reduced in particular flow conditions.

The fluidic actuator 1 includes: an outlet device 20 having at least two outlet lines with outlet openings (not shown in FIGS. 1 to 7) provided at their respective ends, a fluid supply device 30 connected to the outlet lines and having a supply line 31 for supplying fluid at a predetermined feed pressure, a flow direction deflecting device 50 into which the supply line 31 merges and from which the outlet lines emerge, and an actuating device 60 coupled to the flow direction deflecting device 50 for controlling the latter. Hence, in accordance with embodiments of the invention a fluid supplied at a predetermined pressure or minimum pressure via a supply device 30 to a flow direction deflecting device 50 is generally deflected in a cyclical sequence into a respective one of a plurality of outlet lines. By means of the actuating device 60, which may assume corresponding switching conditions for this purpose, the flow direction deflecting device 50 is set to different conditions wherein the supplied fluid is introduced into a respective one of the outlet lines while none or only a comparatively small amount thereof flows through the respective at least one another outlet line, with the fluid successively being conducted in a cyclical sequence into each one of the outlet lines. As a result of changing the respective outlet line for the outgoing flow of a principal quantity of the supplied fluid, a pulsed outlet flow is created at each outlet opening associated to a respective outlet line.

In accordance with embodiments of the invention it may generally be provided that the entire supplied fluid quantity or a major part thereof, such as in particular 90% thereof, is introduced into the outlet line provided in accordance with the respective switching condition. Here it is not necessary to supply the entire supplied fluid quantity to one respective outlet line. In accordance with embodiments of the invention it is provided that in the outgoing flow of the fluid supplied at a feed pressure, at least 50% of the supplied quantity of the fluid and thus of the throughput of the fluid supplied via the supply device 30, flows through one respective outlet line. In a preferred manner it is, however, provided that in correspondence to the switching condition of the switching device 65 at least 75% of the supplied quantity of the fluid flows through one respective outlet line and in particular one respective outlet line activated by the switching device 65.

Due to the solution in accordance with embodiments of the invention, a same actuator 1 may be utilized for very different applications as it is scalable within a very wide range: the feed pressure and the throughput of the fluid supplied via the supply device 30 may be varied without the necessity of adapting the actuator 1. Moreover the flow direction deflecting device 50 and the outlet device 20 may be made in one piece, so that the actuator 1 may be produced in a very economical manner. This part of the actuator 1 accordingly possesses a very high degree of reliability. In addition, the outflow and inflow characteristics are symmetrical, so that the flow efficiency of the actuator 1 is furthermore very high.

The flow direction deflecting device 50 may be realized in various manners. In accordance with one preferred practical example embodiment of the invention it is provided in particular that the direction of flow of the fluid supplied via the supply device 30 is influenced in the flow direction deflecting device 50 by means of a fluid flowing via correspondingly arranged control lines, whereby the described effect in accordance with embodiments of the invention of introduction into the respective outlet line is brought about.

Figure 7:
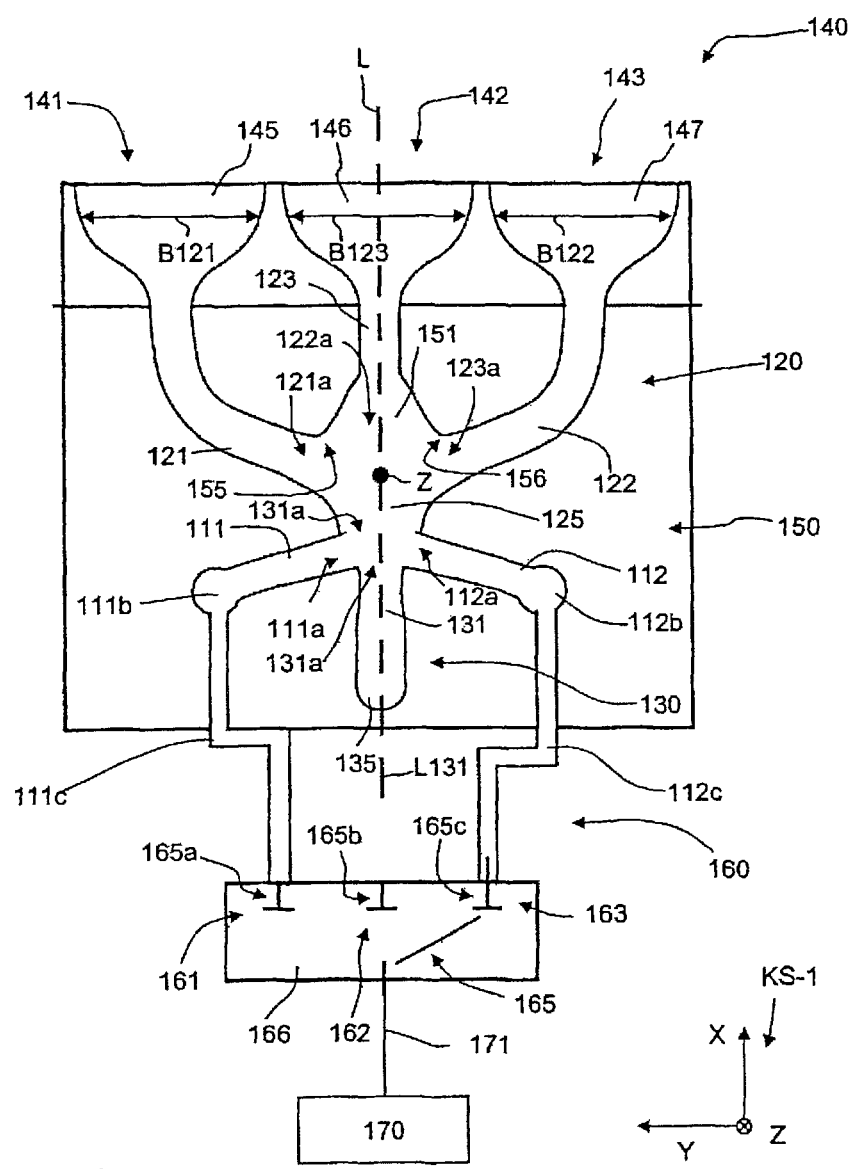
FIG. 7 is a schematic sectional view of another embodiment of a fluid actuator of the invention including three outlet lines and three control lines, having an actuating device for controlling the outlet flows through the outlet lines.

FIGS. 1 to 3 and FIGS. 4 to 6 illustrate a respective practical example embodiments of the actuator 1 of the invention including two respective outlet lines 21, 22, whereas in FIG. 7 a practical example embodiment of the actuator 1 of the invention including three outlet lines 121, 122, 123 is illustrated. The respective openings associated to the outlet lines are preferably arranged side by side transversely to the direction of flow.

Figure 2:
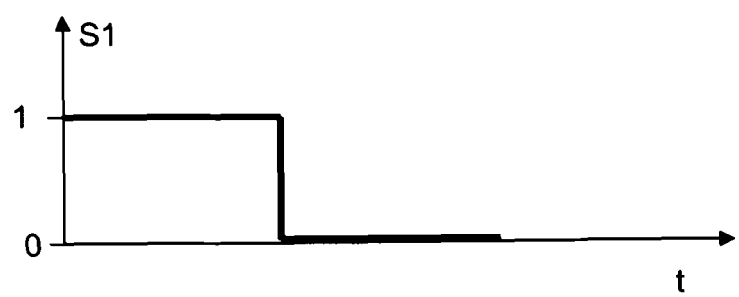
FIG. 2 is a diagram representing the pressure versus time in a first control line of the practical example of FIG. 1 within one switching cycle of an actuating device of the fluid actuator provided in accordance with an embodiment of the invention.
Figure 3:
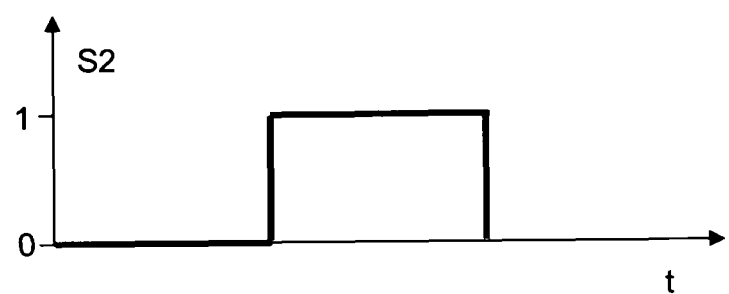
FIG. 3 is a diagram representing the pressure versus time in a second control line of the practical example of FIG. 1 within the switching cycle also represented in FIG. 2.

The practical example of FIGS. 1 to 3 shows two outlet lines 21, 22 each having associated thereto one outlet opening 41, 42. FIGS. 4 to 6 show a realization of an actuator 1 in accordance with the schematic representation shown in FIG.

1. In FIGS. 4 to 6, represented components serving similar functions in comparison with the components represented in FIG. 1 are provided with identical reference symbols. As may be seen in FIG. 4 in comparison with the sectional view of FIG. 6 along line 6-6 in FIG. 4, the width B21, B22 of the outlet lines 21, 22 increases in an end portion thereof, while their depth T22 (the depth for the outlet line 21 is not shown in FIG. 6) decreases such that the cross-sectional area of the respective outlet lines 21 and 22 remains constant. In this way the mass throughput of the fluid also remains constant in this area. Due to the increase in width of the outlet line in an end portion thereof, the latter forms a respective actuator chamber or outlet chamber 45 or 46 in which an adaptation to the width of the outlet opening intended to be provided is realized. In one embodiment in accordance with the invention it is provided that in an end portion of the outlet lines 21, 22 the width B21, B22 thereof increases and the depth thereof decreases such that the cross-sectional area of the respective outlet line 21 or 22 remains constant within a margin of deviation of 10% relative to the respective cross-sectional area.

In accordance with one practical example of the fluid actuator 1 in particular for an application for an aerodynamic body, there results a slit-type outlet opening 41, 42 which may present, e.g., a depth of 0.2 cm to 0.8 cm and a width of 20 cm to 100 cm.

For orientation purposes an actuator coordinate system KS-1 was entered in FIG. 1 which defines an actuator longitudinal direction X, an actuator width direction Y, and an actuator depth direction Z. In a preferred manner the width B21 or B22 entered in FIG. 4 extends in or at least along the perpendicular line to the direction of the flow that occurs, in accordance with its intended purpose, in that location of the flow body in which the respective outlet openings are arranged. For example for the case that the outlet openings are provided on a wing or a flap of an aircraft, the width B21 or B22 extends in or at least along the depth direction of the wing or flap.

The practical example of the fluid actuator 100 shown in FIG. 7 includes three outlet lines 121, 122, 123 and outlet openings 141, 142 and 143 on the respective end portions 145, 146 and 147 of the outlet lines 121, 122, 123. The features described with reference to FIGS. 1 to 6 are also provided in the practical example of FIG. 7.

The outlet lines 21, 22 or 121, 122, 123 constitute discharge openings of an interaction chamber 51 or 151 as a part of an embodiment of the flow direction deflecting device 50 or 150. To the interaction chamber 51 or 151 there are connected, on the one hand, the fluid supply device 30 or 130 having a fluid supply line 31 or 131 and a connection 35 or 135 to a pressure or supply source, as well as an actuating device 60 or 160 having an array of control lines.

In the practical example of FIGS. 1 to 6, two control lines or pressurization lines 11, 12 merge into the interaction chamber 51, with the fluid supply line 31 extending between these, so that the inlet 31a of the fluid supply line 31 into the interaction chamber 51 is situated between the inlets 11a, 12a of the two control lines 11 and 12. In addition, the two control lines 11 and 12 merge into the interaction chamber 51 at an angle, preferably between 20 and 70 degrees to the longitudinal direction L31 of the fluid supply line 31 or the inlet 31a of the latter. In this way the direction of flow of the fluid flowing into the interaction chamber from the fluid supply line 31 may be deflected by one of the control lines 11, 12 into the respective inlet opening 22a or 21a of the outlet lines 22 and 21 that is opposite to it relative to the center of the interaction chamber 51 when a reduced inflow through the another or at least one another control line takes place in comparison with the control line performing control at the respective point of time, and when no inflow of fluid takes place.

In the practical example according to FIG. 7, two control lines or pressurizing lines 111, 112 are provided between which the fluid supply line 131 extends. The inlet 131a of the fluid supply line 131 into the interaction chamber 151 is thus situated between the inlets 111a, 112a of the two control lines 111 and 112. Here it is preferably provided that the two control lines 111, 112 each merge into the interaction chamber 151 at an angle preferably between 20 and 70 degrees to the longitudinal direction of the fluid supply line 131 or the inlet 131a of the latter, so that the direction of flow of the fluid flowing into the interaction chamber 151 from the fluid supply line 131 is deflected by the fluid flow flowing into the interaction chamber 151 from the control lines 111, 112, depending on the direction of inflow of this fluid flow into one of the inlet openings 121a, 122a or 123a of the outlet lines 121, 122 and 123. Here the third outlet line 123 is situated between a first outlet line 121 and a second outlet line 122. In addition, in a preferred embodiment the third outlet line 123 is situated centrally on the longitudinal axis L131, and the first outlet line 121 and the second outlet line 122 are arranged symmetrically with regard to the longitudinal axis L131. In this way the direction of flow of the fluid flowing into the interaction chamber from the fluid supply line 131 may be deflected by one of the control lines 111, 112 into the inlet opening 122a or 121a of the outlet lines 122 and 121 or the inlet opening 123a of the third outlet line 123 situated in opposition thereto with regard to the center of the interaction chamber 151, if the control flows through the control lines 111, 112 occurring concurrently are apportioned correspondingly.

In order to achieve that the fluid flowing into the interaction chamber 151 from the fluid supply line 131 is deflected, by means of the control flows that may introduced into the interaction chamber 151 through the two control lines 111, 112, into a respective one of three outlet lines 121, 122 and 123, three switching conditions 165a, 165b, 165c are provided in the switching device 165 which are represented symbolically in FIG. 7. These are adapted in such a way that in a first switching condition 165a, the control flow emerging from the first control line 111 flows into the interaction chamber 151 at a maximum velocity, and concurrently the control flow emerging from the second control line 112 flows into the interaction chamber 151 at a minimum velocity, or concurrently no control flow flows into the interaction chamber 151 from the second control line 112;

that in a second switching condition 165b, the control flow emerging from the first control line 111 and the control flow emerging from the second control line 112 each flow into the interaction chamber 151 at a medium velocity, the magnitude of which lies between the amounts of the minimum and maximum velocities;

that in a third switching condition 165c, the control flow emerging from the first control line 111 flows into the interaction chamber 151 at a minimum velocity, or no control flow flows into the interaction chamber 151 from the first control line 111, and concurrently the control flow emerging from the second control line 112 flows into the interaction chamber 151 at a maximum velocity.

In the first switching condition 165a, the fluid flowing into the interaction chamber 151 from the fluid supply line 131 flows into the third outlet line 123 which is situated in opposition to the inlet 111a of the first control line 111 relative to a geometrical or spatial center Z of the interaction chamber 125. In the third switching condition 165c, the fluid flowing into the interaction chamber 151 from the fluid supply line 131 flows into the first outlet line 121 which is situated in opposition to the inlet 112a of the second control line 112 relative to the spatial center Z of the interaction chamber 125. In the second switching condition 165b, the fluid flowing into the interaction chamber 151 from the second fluid supply line 132 flows into the second outlet line 122 which is situated between the first outlet line 121 and the third outlet line 123 with regard to the longitudinal axis L131 of the actuator 1.

The actuator 100 is preferably adapted such that the minimum velocities and maximum velocities of the control flows emerging from the first control line 111 or the second control line 112 have a respective same magnitude within predetermined variations.

In analogy with the embodiment shown in FIG. 4 and the sectional view along the section line 6-6 of FIG. 4 shown in FIG. 6, it may also be provided in the embodiment according to FIG. 7 and in variants of this embodiment or in embodiments alternative to these, that in an end portion or in the end portion of the outlet lines 121, 122, 123 the width B121, B122 thereof increases and the depth (not shown) decreases such that the cross-sectional area of the respective outlet lines 121 or 122 or 123 remains constant. Here it may in particular be provided that in an end portion of the outlet lines 121, 122, 123, the width B121, B122 and B123 thereof increases and the depth thereof decreases such that the cross-sectional area of the respective outlet line 121 or 122 or 123 remains constant within a margin of deviation of 10% relative to the respective cross-sectional area.

In an alternative embodiment of the actuator 1 for the embodiment represented in FIG. 7, the latter may also include a third control line (not represented in FIG. 7), with the control lines having a star-shaped arrangement with regard to the spatial center Z, such that a respective control line and a respective outlet line 121, 122 or 123 each are situated in opposition to each other with regard to the spatial center Z of the interaction chamber 125. Here it is also possible to set three switching conditions in the switching device 165, with the fluid flowing out at a predetermined control pressure from a respective one and a respective another one of the three control lines in these switching conditions. Here it is preferably provided that the three control lines each merge into the interaction chamber 151 at an angle preferably between 20 and 70 degrees to the longitudinal direction of the fluid supply line 131 or the inlet 131a thereof, so that the direction of flow of the fluid flowing into the interaction chamber 151 from the fluid supply line 131 is deflected by one of the control lines into the respective inlet opening 121a, 122a or 123a of the outlet lines 121, 122 or 123 that is opposite to it relative to the center of the interaction chamber 151 when a reduced inflow through the another or at least one another control line takes place in comparison with the control line performing control at the respective point of time, and when no inflow of fluid takes place.

In order to achieve that the respective condition—in which the fluid flowing into the interaction chamber 51 or 151 from the fluid supply line 31 or 131 is deflected into one of the outlet lines—is a stable flow condition within the fluid actuator 1 as long as fluid is supplied into the interaction chamber 51, 151 through the respective control line at a predetermined control pressure, a respective flow dividing means is disposed in the interaction chambers 51 and 151 between two respective inlets 21a, 22a or 121a, 122a, 123a of outlet lines. In the embodiment having two inlets 21a, 22a in accordance with FIGS. 1 to 6, one flow dividing means 55 is formed between these, and in the embodiment having three inlets 121a, 122a, 123a in accordance with FIG. 7, one flow dividing means 155, 156 is formed between two respective inlets 121a, 122a, 123a. In the alternative embodiment for the embodiment illustrated in FIG. 7, a total of three flow dividing means are disposed in a three-dimensional star-shaped configuration in the three outlet lines 121, 122 and 123 and have a same angular distribution with regard to the longitudinal axis L, with one respective flow dividing means thus being disposed between each outlet line.

Each flow dividing means is a three-dimensionally configured wall front part of the wall of the interaction chamber, which divides a corresponding flow with respect to inflow into one or both of the respective adjacent outlet lines. The flow dividing means may be adapted to be pointed or rounded. In the practical example of FIGS. 1 to 6, or in the practical example of FIG. 7, the flow dividing means 55 is and the flow dividing means 155, 156 are formed to be pointed or nearly pointed. With the aid of the flow dividing means it is possible to engender partly stable flow conditions in the actuator 1, so that respective multi-stabile flow conditions in the fluid actuator 1 are achieved through the configuration of the interaction chamber 51; 151 owing to the settable switching conditions.

As may be seen from the fluid actuators illustrated in FIGS. 4 to 6 and 7, it is one advantage of various embodiments of the invention that the supply device 30 or 130, the flow deflection device 50 or 150 and the outlet device 20 or 120 may be produced from a mechanical component 2 or 102, i.e. in particular from one piece, for example by an molding method or press-forming.

The angle that is present at the flow dividing means between the mutually contacting wall surfaces of the respective adjacent outlet lines 21, 22 or 121, 122, 123 is preferably between 2 degrees and 25 degrees in order to achieve the respective stable flow conditions corresponding to the opening constellation of the switching valves. This angle results to be the angle of the branching wall contour lines of the respective adjacent outlet lines 21, 22, 121, 122, 123 at a distance in the direction of flow behind the foremost location of the flow dividing means that is equal to the greatest diameter of the respective inlet of the outlet lines 21, 22, 121, 122, 123. This angle may in particular be determined on the basis of a section through the respective adjacent outlet lines being observed, which is selected such that the directions of these outlet lines is situated at the location of their respective inlets in the sectional plane.

In order to control and alter the inflow of fluid through the respective control line 11, 12 or 111, 112, 113, a respective switching valve or control valve 61, 62 or 161, 162, 163 of a switching device 65 or 165 belonging to the actuating device 60 or 160 is connected to each one of the control lines 11, 12 and 111, 112, 113 in order to operate the valves 61, 62 or 161, 162, 163.

For this purpose a switching chamber 66 or 166 may be provided into which the fluid is introduced at the intended control pressure. The switching chamber is provided with outlet openings which are in fluid communication with a respective one of the control lines 11, 12, and at each of which a respective one of the switching valves is arranged.

In order to activate the switching valves, a switching device activating device 70 including a corresponding activating function for commanding the respective associated switching valves is provided (not shown in FIG. 7). The switching device activating device 70 or 170 may be communicated through connecting lines 11a, 12a or 111a, 112a with the pressurizing supply lines 11, 12 or 111, 112, 113 via a respective control port 11b, 12b, with one respective connecting line 11a, 12a or 111a, 112a being connected to one respective control line.

In the following, the operation of various embodiments of the invention shall be explained with reference to the practical examples of FIGS. 1 to 6 and FIG. 7: Fluid is supplied through the supply line 31, 131. With the aid of the switching device activating device 70 it is possible to connect a respective one of the control lines 11, 12 or 111, 112, 113 to a pressure reservoir if the switching valve 61, 62 or 161, 162, 163 connected at the respective control line is opened. The respective another switching valves are set in their closed position or at least in a partly closed condition. Pressure compensation of the respective associated control line with the control fluid reservoir (not represented in the figures), in which the fluid for the control lines is provided, is not possible through the respective closed switching valve or the respective closed switching valves, and the static pressure of the fluid flow or air flow flowing in the supply line 31 or 131 comes to be established in the control branch closed by the respective control valve. Here the static pressure in the reservoir is slightly higher than the static pressure of the fluid flow exiting from the fluid supply line 31 or 131.

The switching device 65 or 165 is in particular adapted such that only one of the plurality of control valves 61, 62 or 161, 162, 163 of the actuating device 60 or 160 is opened fully, while the respective another switching valve oder the another switching valves 61, 62 or 161, 162, 163 are closed, or are opened to a clearly lesser degree in comparison with the fully opened control valve. As a result, fluid having the provided control pressure flows through only one of the control lines or predominantly through on of the control lines of an actuating device 60, 160.

In FIGS. 2 and 3 an activation period of the switching condition S1, S2 of the two control valves 61 and 62 is represented for a practical example of the fluid actuator 1 according to FIGS. 1 to 6, wherein the value "1" designates an open condition of the respective control valve 61 or 62, and the value "0" designates a closed condition of the respective control valve 61 or 62. As a result, there exists a saltus function for the development of the opening conditions of control valves 61, 62 versus the time t.

If, for example, in the practical example of FIGS. 1 to 6 the control valve 61 is closed and the control valve 62 is opened, then the static pressure of the main fluid flow in the supply line 31 comes to be established in the control line 11, and the, particularly higher, pressure of the control fluid reservoir prevails in the control line 12. As a result of the outgoing flow of control fluid from the outlet 11a of the control line, the jet-type flow exiting from the outlet 31a of the supply line 31 is subjected to a force transverse to its direction of flow and is in this case deflected toward the lower pressure, i.e. in the direction of the outlet line 21. Owing to the configuration of the interaction zone 55 the fluid actuator 1 is bi-stable. Both the case of the jet exiting through the outlet line 21 and the case of the jet exiting through the outlet line 22 may represent stable conditions. Which one of the two conditions is assumed at a given time by the flow within the fluid actuator thus depends on the switching condition of the switching valves 61, 62 and on the pressure difference exerted by the flow in the control lines 11, 12 laterally of the outflow from the supply line 31, so that a corresponding deflection of the fluid flowing from the supply line 31 is brought about as a result. If the fluid jet flowing from the supply line 31 is deflected to one or another side of the outlet lines 21, 22, the Coanda effect keeps it directed to that side until the switching condition is changed. Accordingly these are bi-stabile flow conditions within the fluid actuator 1. The mass flow in the supply line 31 is preferably substantially greater than the mass flow through the control lines 11 or 12, whereby a high efficiency is achieved which is not achieved by known actuators such as, in particular, by solenoid-based actuators.

The practical example of the fluid actuator 1 according to FIG. 7 operates analogously with three control lines 111, 112, 113 and three outlet lines 131, 132, 133 instead of the two control lines 11, 12 and two outlet lines 31, 32 in accordance with the practical example of FIGS. 1 to 6.

The actuating device 60, 160 in particular includes a switching device activating device 70 or 170 including a corresponding activating function for activating the switching valves. The switching device activating device 70 or 170 is functionally communicated with the switching device 65 or 165 via a connecting line 71 or 171 for the transmission of switching commands that are generated by the switching device activating device 70 or 170. The activating function is adapted such that it may take the switching valves 61, 62; 161, 162, 163 into a succession of switching conditions provided in accordance with embodiments of the invention, wherein in a cyclical sequence a respective one of the switching valves 61, 62 or 161, 162, 163 is in an open condition while the at least another switching valve from among the plurality of switching valves 61, 62; 161, 162, 163 is in a closed condition.

The frequency for changing the switching conditions is specified by the activating function or set on the basis of specifications which it receives from an associated system. By repeatedly changing the switching conditions a pulsed ejection at the outlet openings 45, 46 or 145, 146, 147 is achieved. In particular a frequency of 500 Hz to 0.01 kHz may be provided herefor. The activating function thus fixes the points of time at which the respective switching conditions are activated. Here it may in particular be provided that the switching conditions change at respective identical time intervals, whereby it is possible to create pulses occurring periodically in the fluid. Alternatively or additionally it may also be provided that the switching conditions are commanded by the control device in an irregular manner.

In the application of embodiments of the actuator of the invention 1 to an aerodynamic body, in particular a frequency range between 20 and 70 Hz may be provided in order to provide an aerodynamically effective pulsed ejection at the openings of the aerodynamic body.

Optionally flow sensors 71, 72 (shown in FIG. 1 only) for detecting a flow condition in the outlet line, such as, e.g., a pressure or a velocity, may be provided at the outlet lines and in particular at the actuator outlet chambers 31, 32 or 131, 132, 133. for the transmission of the sensor signals generated by the sensors 71, 72 on the basis of the respective detected flow conditions, the sensors 71, 72 are functionally connected to the switching device activating device 70. They may be provided for monitoring the functionality. In particular a monitoring function may be arranged in the switching device activating device 70 which compares the sensor signals transmitted by the sensors 71, 72 to target values corresponding to minimum flow values, and the fluid actuator may be evaluated as being faulty when a minimum flow value is not attained. In this case it may further be provided that the monitoring function sends a corresponding command signal to a supply unit to place it in an inactive state and, e.g., conduct no fluid into the interaction chamber. Alternatively the switching device activating device 70 may include a regulating function which generates activating commands on the basis of the respective received sensor signals and a target specification and transmits it to the switching device for actuation thereof.

In accordance with a practical example embodiment of the invention, an actuating device may be associated to a respective plurality of interaction chambers. To each interaction chamber two or three outlet openings on the flow body are associated, so that a plurality or a multiplicity of outlet openings on the flow body may be activated with the aid of one actuating device. As a result, a larger flow region on the flow body may be influenced with the aid of one actuating device.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A fluid actuator for influencing the flow along a flow surface by ejection of a fluid flowing through the fluid actuator, comprising at least two outlet lines having outlet openings provided at the respective ends thereof, wherein in an end portion of the outlet lines their width increases and their depth decreases such that the cross-sectional area of the respective outlet line remains substantially constant relative to the respective cross-sectional area of the outlet opening of the outlet lines, and a supply line connected to the outlet lines for supplying fluid at a feed pressure, a flow direction deflecting device into which the supply line merges and from which the outlet lines emerge, and an actuating device coupled with the flow direction deflecting device for controlling the latter, which is adapted such that the fluid is successively conducted into each one of the outlet lines in a cyclical sequence.

2. A fluid actuator for influencing the flow along a flow surface through ejection of a fluid flowing through the fluid actuator, comprising:
an outlet device having at least two outlet lines and at least two openings for ejecting a fluid, one of which is communicated with a respective outlet line, wherein in an end portion of the outlet lines, their width increases and their depth decreases such that the cross-sectional area of the respective outlet line remains substantially constant relative to the respective cross-sectional area of the outlet opening of the outlet lines,
an interaction chamber which is communicated with each one of the outlet openings via a respective flow line and which includes a flow-dividing device arranged at the inlet of the outlet lines,
a supply line to the interaction chamber for supplying fluid into the interaction chamber at a feed pressure,
at least two control lines, each for supplying fluid at a predetermined control pressure, and each of which is connected by an end to the interaction chamber, wherein the interaction chamber is configured such that when fluid is supplied at a predetermined control pressure through a respective one of the control lines, the fluid flowing at a feed pressure into the interaction chamber through the supply line to the interaction chamber is deflected into one respective predetermined outlet line from among the outlet lines, so that multi-stable flow conditions are achieved in the actuator by the configuration of the interaction chamber.

3. The fluid actuator according to claim 2, wherein the fluid actuator comprises two outlet lines and two control lines, and that the flow-dividing device is a spike-type wall member of the interaction chamber which is situated between the two outlet lines.

4. The fluid actuator according to claim 2, wherein the supply line to the interaction chamber comprises a connection to a fluid supply device.

5. The fluid actuator according to claim 2, wherein the two control lines are each connected by one end to a pressure control device, and each presents a connection to a fluid supply device.

6. The fluid actuator according to claim 2, wherein the first outlet line and the second outlet line are situated in opposition to each other relative to the longitudinal axis of the actuator, and in particular symmetrically with respect to the longitudinal axis, and wherein the control lines are in opposition to a respective one of the inlet openings of the outlet lines relative to the center of the interaction chamber.

7. The fluid actuator according to claim 2, wherein the fluid actuator comprises three outlet lines and two control lines, and wherein the flow-dividing device comprises a first spike-type wall member which is situated between the inlets of a first and a second outlet line, and a second spike-type wall member which is situated between the inlets of a third and a second outlet line.

8. The fluid actuator according to claim 7, wherein the first outlet line and the third outlet line are situated in opposition to each other relative to the longitudinal axis of the fluid actuator and in particular symmetrically with respect to the longitudinal axis, the second outlet line being situated between the first outlet line and the third outlet line and in particular centrally on the longitudinal axis of the fluid actuator.

9. The fluid actuator according to claim 7, wherein the fluid supply line is situated in opposition to the second outlet line relative to the center of the interaction chamber, and each one of the control lines is situated in opposition to a respective inlet opening of the first or third outlet line relative to the center of the interaction chamber.

10. The fluid actuator according to claim 7, wherein the fluid actuator comprises a third control line, with the first, second and third control lines having a star-shaped arrangement with regard to the spatial center, such that each control line and a respective one of the outlet lines are situated in opposition to each other relative to the spatial center of the interaction chamber.

11. The fluid actuator according to claim 2, wherein the cross-sectional area of the respective outlet line remains constant within a margin of deviation of 10% relative to the respective cross-sectional area of the outlet opening of the outlet lines.

12. The fluid actuator according to claim 2, wherein in order to control and alter the inflow of fluid through the respective control line, a respective control valve of a switching device belonging to the actuating device is connected to each one of the control lines for operating the valves.

13. A blow-out device for ejecting a fluid from a flow body, comprising a fluid actuator according to claim 1 and an actuating device,
wherein the actuating device comprises a chamber having an opening for supplying fluid at a control pressure, a plurality of control valves each of which is associated to a respective control line, and a switching device, said switching device being adapted for setting switching conditions of the control valves, wherein one respective valve of the plurality of control valves is opened and the at least another valve from among the plurality of control valves is closed,
wherein the actuating device comprises a switching device activating device which is functionally communicated with the switching device via a connecting line for the transmission of switching commands and which activates the switching device such that the control valves are taken into a succession of the switching conditions where, in a cyclical sequence, a respective one of the control valves is in an open condition while the at least another control valve from among the plurality of control valves is in a closed condition, wherein the control pressure is provided such that in every switching condition, the fluid introduced into the interaction chamber at the feed pressure flows at a ratio of at least 75% into precisely one respective outlet line associated to said switching condition, wherein in an end portion of the outlet lines, their width increases and their depth decreases such that the cross-sectional area of the respective outlet line remains constant relative to a respective cross-sectional area of an outlet opening of the outlet lines.

14. A blow-out device for ejecting a fluid from a flow body, comprising a fluid actuator having at least two outlet lines with outlet openings provided at the respective ends thereof and a supply line connected to the outlet lines for supplying fluid at a feed pressure, wherein in an end portion of the outlet lines, their width increases and their depth decreases such that the cross-sectional area of the respective outlet line remains constant relative to a respective cross-sectional area of an outlet opening of the outlet lines, a flow direction deflecting device into which the supply line merges and from which the outlet lines emerge, and an actuating device coupled to the flow direction deflecting device for activating the latter, wherein the actuating device includes an activating function whereby the flow direction deflecting device performs a deflection of a predetermined volume flow of the fluid supplied via the supply line into a respective one of the outlet lines, the fluid being successively conducted into each one of the outlet lines in a cyclical sequence.

15. The blow-out device according to claim 14, wherein the switching device activating device may be used for adjusting the frequency of the cyclical setting of switching conditions.

16. The blow-out device according to claim 14, wherein a sensor for detecting the flow condition is arranged on each outlet line, each sensor being functionally coupled with the respective switching device activating device for the transmission of sensor signals generated by the respective sensor, wherein the switching device activating device includes a regulating function which generates activating commands based on the respective received sensor signals and a target specification, and transmits them to the switching device for operating the latter.

17. A flow body comprising a plurality of ejection openings and a blow-out device according to claim 14.

18. The flow body according to claim 17, wherein one respective actuating device is associated to a plurality of interaction chambers.

* * * * *